US011538300B2

(12) United States Patent
Nakajima et al.

(10) Patent No.: US 11,538,300 B2
(45) Date of Patent: *Dec. 27, 2022

(54) AUTHENTICATION INFORMATION ISSUING APPARATUS, DELIVERY SYSTEM AND AUTHENTICATION INFORMATION ISSUING METHOD

(71) Applicant: TOYOTA JIDOSHA KABUSHIKI KAISHA, Toyota (JP)

(72) Inventors: Etsuko Nakajima, Nagoya (JP); Naoki Uenoyama, Nisshin (JP); Junya Masui, Nagoya (JP); Akira Hoshino, Nagoya (JP); Hideo Hasegawa, Nagoya (JP); Keiko Nakano, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/648,784

(22) Filed: Jan. 24, 2022

(65) Prior Publication Data

US 2022/0144210 A1    May 12, 2022

Related U.S. Application Data

(63) Continuation of application No. 17/100,175, filed on Nov. 20, 2020, now Pat. No. 11,276,260, which is a
(Continued)

(30) Foreign Application Priority Data

Apr. 24, 2018   (JP) .............................. JP2018-082952

(51) Int. Cl.
*G07C 9/00*      (2020.01)
*G06F 21/44*     (2013.01)
(Continued)

(52) U.S. Cl.
CPC .......... *G07C 9/00309* (2013.01); *B60R 25/01* (2013.01); *B60R 25/20* (2013.01);
(Continued)

(58) Field of Classification Search
None
See application file for complete search history.

(56) References Cited

U.S. PATENT DOCUMENTS 8,331,544 B2   12/2012  Kraus
10,328,900 B1   6/2019  Yakovenko et al.
(Continued)

FOREIGN PATENT DOCUMENTS

JP    2002-304450    10/2002
JP    2006-206225     8/2006
(Continued)

*Primary Examiner* — K. Wong
(74) *Attorney, Agent, or Firm* — Oblon, McClelland, Maier & Neustadt, L.L.P.

(57) ABSTRACT

An information processing apparatus includes a processor and a memory. The memory is in communication with the processor, where the memory stores computer-readable instructions that are executed by the processor. The processor performs operations including storing, in association with each other, vehicle position information with which a vehicle is identified, and parcel receipt information with which the vehicle is specified instead of an address or a name. The operations further include specifying the vehicle based on the parcel receipt information. The operations further include acquiring authentication information with which the vehicle is unlocked. The operations further include sending the authentication information to a device.

20 Claims, 5 Drawing Sheets

Related U.S. Application Data continuation of application No. 16/387,965, filed on Apr. 18, 2019, now Pat. No. 10,891,811.

(51) Int. Cl.
  *B60R 25/01* (2013.01)
  *B60R 25/20* (2013.01)
  *B60R 25/34* (2013.01)
  *G06Q 10/08* (2012.01)

(52) U.S. Cl.
  CPC .............. *B60R 25/34* (2013.01); *G06F 21/44* (2013.01); *G06F 21/445* (2013.01); *G06Q 10/0832* (2013.01); *G07C 2009/00396* (2013.01); *G07C 2009/00507* (2013.01)

(56) References Cited

U.S. PATENT DOCUMENTS

| | | | |
|---|---|---|---|
| 10,573,110 | B2 | 2/2020 | Tsujimura et al. |
| 10,576,932 | B2 | 3/2020 | Yakovenko |
| 11,276,260 | B2 * | 3/2022 | Nakajima ............... G06F 21/44 |
| 2016/0099927 | A1 | 4/2016 | Oz et al. |
| 2018/0240067 | A1 | 8/2018 | Oz et al. |
| 2019/0259232 | A1 | 8/2019 | Nandakumar |
| 2019/0325680 | A1 | 10/2019 | Nakajima et al. |

FOREIGN PATENT DOCUMENTS

| | | |
|---|---|---|
| JP | 2014-145200 | 8/2014 |
| JP | 2018-204363 A | 12/2018 |
| JP | 6531853 B1 | 6/2019 |

* cited by examiner

PARCEL INFORMATION

| PARCEL ID (SLIP NUMBER) | PARCEL RECEIPT ID |
|---|---|
| D000000000001 | B001 |
| ... | ... |

FIG. 4A

DELIVERY DESTINATION INFORMATION

| PARCEL RECEIPT ID | VEHICLE ID |
|---|---|
| B001 | V001 |
| B002 | V002 |
| ... | ... |

FIG. 4B

VEHICLE INFORMATION

| VEHICLE ID | VEHICLE NUMBER | POSITION INFORMATION |
|---|---|---|
| V001 | XX-XX | NL ... , EL ... |
| V002 | XX-XX | NL ... , EL ... |
| ... | ... | ... |

US 11,538,300 B2

AUTHENTICATION INFORMATION ISSUING APPARATUS, DELIVERY SYSTEM AND AUTHENTICATION INFORMATION ISSUING METHOD

CROSS-REFERENCE TO RELATED APPLICATIONS

The present application is a continuation of priority from U.S. application Ser. No. 17/100,175, filed on Nov. 20, 2020, which is a continuation of U.S. application Ser. No. 16/387,965, filed on Apr. 18, 2019, which claims the benefit of priority from Japanese Patent Application No. 2018-082952, filed on Apr. 24, 2018; the entire contents of each of which are incorporated herein by reference.

BACKGROUND

1. Technical Field

The disclosure relates to a system that temporarily holds a parcel using a vehicle, an authentication information issuing apparatus and an authentication information issuing method.

2. Description of Related Art

There has been proposed a technology in which acceptance of a delivery object is performed at a trunk of a parcel receiving vehicle designated as a destination by a receiver (see Japanese Patent Application Publication No. 2006-206225, for example). With the technology, the receiver designates a receiver's own vehicle as the destination, and thereby, can receive the delivery object even while the receiver is out, without installing a home delivery locker or the like for receiving the delivery object.

SUMMARY

When the receiver designates the vehicle as the delivery destination of a parcel, the receiver needs to notify a delivery business operator of the position, vehicle number (number plate), vehicle model and others of the vehicle. However, in the case where a product is ordered at an EC site and where the EC site makes a contract with a plurality of delivery business operators, no delivery business operator is sometimes determined at the stage of the order. In this case, it is necessary to leave information relevant to the vehicle as the delivery destination, in the EC site. On this occasion, the information relevant to the vehicle is disclosed to a business operator other than the delivery business operator, and therefore, there is a security concern. For solving this problem, it is necessary to construct a system in which the vehicle as the delivery destination can be specified only with minimum necessary information.

The disclosure provides an authentication information issuing apparatus and a delivery system that assure security in a system that temporarily holds a parcel using a vehicle.

An authentication information issuing apparatus in a first aspect according to the disclosure is configured to issue authentication information with which a vehicle is unlocked, to a portable terminal, the vehicle being capable of containing a parcel and being locked and unlocked based on the authentication information acquired from the portable terminal. Specifically, the authentication information issuing apparatus includes a storage device, an acquiring device and an authentication information sending device. The storage device is configured to store a parcel receipt ID as information with which a delivery destination of the parcel is specified and a vehicle ID as information with which the vehicle is identified, in association with each other. The acquiring device is configured to acquire the parcel receipt ID associated with a target parcel. The authentication information sending device is configured to send the authentication information with which a vehicle as a containment destination of the parcel is unlocked, to the portable terminal, based on the acquired parcel receipt ID.

The parcel receipt ID is information with which the delivery destination of the parcel is specified. The parcel receipt ID does not need to be information with which the vehicle to contain the parcel is directly designated. For example, the parcel receipt ID may be a character string, an e-mail address or the like that is designated by a consignee. The vehicle ID is information with which the vehicle capable of containing the parcel is uniquely identified. The storage device stores the parcel receipt ID and the vehicle ID in association with each other. When the acquiring device acquires the parcel receipt ID associated with the target parcel, the authentication information sending device specifies the vehicle corresponding to the parcel receipt ID, and sends the authentication information with which the vehicle is unlocked. With the first aspect, using only the parcel receipt ID, it is possible to specify the vehicle as the containment destination of the parcel, and to issue a key for unlocking the vehicle. That is, when the delivery business operator uses the authentication information issuing apparatus according to the disclosure, the consignee only needs to disclose the parcel receipt ID, for the delivery or the like of the parcel.

In the authentication information issuing apparatus in the first aspect, the vehicle ID as the information with which the vehicle is identified includes a vehicle number and position information of the vehicle.

The authentication information issuing apparatus in the first aspect may further a position information acquiring device configured to acquire position information of the vehicle, and the authentication information sending device may be configured to further send the position information to the portable terminal.

With the configuration of the first aspect, the position information of the vehicle is sent to the portable terminal along with the authentication information, so that a person in charge can easily specify the vehicle.

In the authentication information issuing apparatus in the first aspect, the storage device may be configured to further store characteristic information as information relevant to a characteristic of the vehicle, in association with the parcel receipt ID and the vehicle ID, and the authentication information sending device may be configured to further send the characteristic information to the portable terminal.

The characteristic information may include at least one of the color of the vehicle, the vehicle model of the vehicle, number plate information of the vehicle, the parking section of the vehicle, and the address of the parking place of the vehicle. Since such characteristic information is sent, the vehicle is specified more easily.

In the authentication information issuing apparatus in the first aspect, the storage device may be configured to update information associating the parcel receipt ID and the vehicle ID, based on information acquired from a consignee of the parcel.

With the above configuration of the first aspect, it is possible to flexibly update linkage between the parcel receipt ID and the vehicle ID, based on an instruction of the consignee. For example, as the containment destination, it is possible to designate an arbitrary vehicle that is not possessed by the consignee.

A delivery system in a second aspect according to the disclosure includes a vehicle capable of containing a parcel, and an authentication information issuing apparatus configured to issue authentication information with which the vehicle is unlocked. The vehicle includes a receiving device configured to receive the authentication information with which a door is unlocked, from a portable terminal, and an unlocking device configured to unlock the door based on the authentication information. The authentication information issuing apparatus includes a storage device configured to store a parcel receipt ID as information with which a delivery destination of the parcel is specified and a vehicle ID as information with which the vehicle is identified, in association with each other, an acquiring device configured to acquire the parcel receipt ID associated with a target parcel, and an authentication information sending device configured to send the authentication information with which a vehicle as a containment destination of the parcel is unlocked, to the portable terminal, based on the acquired parcel receipt ID.

The disclosure can be specified as an authentication information issuing apparatus that includes at least some of the above devices. Further, the disclosure can be also specified as a delivery method that is executed by the delivery system. The disclosure can be carried out while the above processes and the above devices are flexibly combined, as long as there in no technical inconsistency.

A third aspect of the disclosure is an authentication information issuing method for an apparatus configured to issue authentication information with which a vehicle is unlocked, to a portable terminal, the vehicle being capable of containing a parcel and being locked and unlocked based on the authentication information acquired from the portable terminal. The authentication information issuing method includes the following steps. That is, the authentication information issuing method includes: (i) storing a parcel receipt ID as information with which a delivery destination of the parcel is specified and a vehicle ID as information with which the vehicle is identified, in association with each other; (ii) acquiring the parcel receipt ID associated with a target parcel; and (iii) sending the authentication information with which a vehicle as a containment destination of the parcel is unlocked, to the portable terminal, based on the acquired parcel receipt ID.

With the authentication information issuing method in the third aspect, the vehicle corresponding to the parcel receipt ID is specified, and the authentication information with which the vehicle is unlocked is sent. Using only the parcel receipt ID, it is possible to specify the vehicle as the containment destination of the parcel, and to issue a key for unlocking the vehicle. That is, when the delivery business operator uses the authentication information issuing method, the consignee only needs to disclose the parcel receipt ID, for the delivery or the like of the parcel.

With the authentication information issuing apparatus, the delivery system and the authentication information issuing method in the disclosure, it is possible to assure security in a system that temporarily holds a parcel using a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An overview of a delivery system according to an embodiment will be described with reference to FIG. 1. The delivery system according to the embodiment is configured to include a locking-unlocking device 100, a portable terminal 200, a delivery management server 300, a key management server 400 and an EC server 500.

In the delivery system according to the embodiment, it is assumed that a product ordered through the EC server 500 by a user is shipped as a parcel and is delivered to a vehicle 10 by a delivery person. In the delivery system according to the embodiment, the locking-unlocking device 100 mounted on the vehicle 10 performs wireless communication with the portable terminal 200 outside the vehicle 10, and locks and unlocks the vehicle 10 based on a result of the communication. That is, it is possible to lock and unlock the vehicle 10 using only the portable terminal 200, without using a physical key. The delivery person to deliver the parcel carries the portable terminal 200, and can lock and unlock the vehicle 10 designated by the consignee, when appropriate. Thereby, it is possible to use the vehicle 10 as a delivery destination (as a home delivery box).

The EC server 500 is a server device that receives an order for the product as a delivery target. When the EC server 500 receives the order for the product from the user, the delivery of the product is arranged, and information relevant to the parcel as the delivery target is sent to the delivery management server 300. The delivery management server 300 is a server device that manages the delivery of the parcel and a plurality of portable terminals 200 each of which is carried by the delivery person to deliver the parcel.

The key management server 400 is a server device that issues authentication information as information with which the locking-unlocking device 100 authenticates the portable terminal 200. The key management server 400 issues first authentication information to the portable terminal 200 through the delivery management server 300, and similarly, issues second authentication information to the locking-unlocking device 100 through the delivery management server 300. By comparing the first authentication information and the second authentication information, the locking-unlocking device 100 authenticates the portable terminal 200 as a rightful device.

Figure 1:
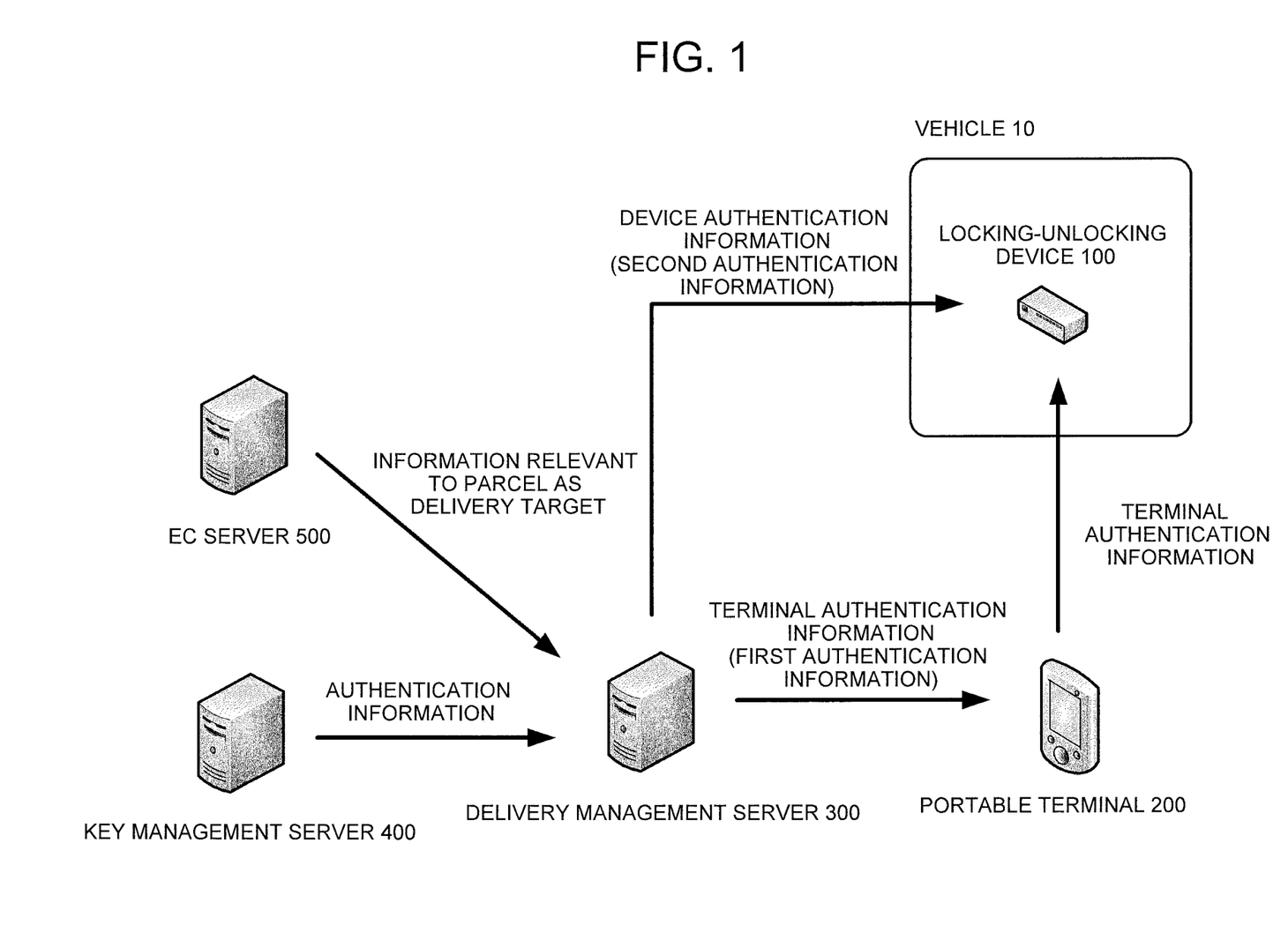
FIG. 1 is a schematic system diagram of a delivery system according to an embodiment of the present disclosure.

FIG. 1 illustrates one portable terminal 200 and one vehicle 10, but the delivery management server 300 may manage a plurality of portable terminals 200. Further, it is allowable to adopt a system in which the portable terminal 200 can access a plurality of vehicles 10. Similarly, a plurality of EC servers 500 may be included.

Figure 2:
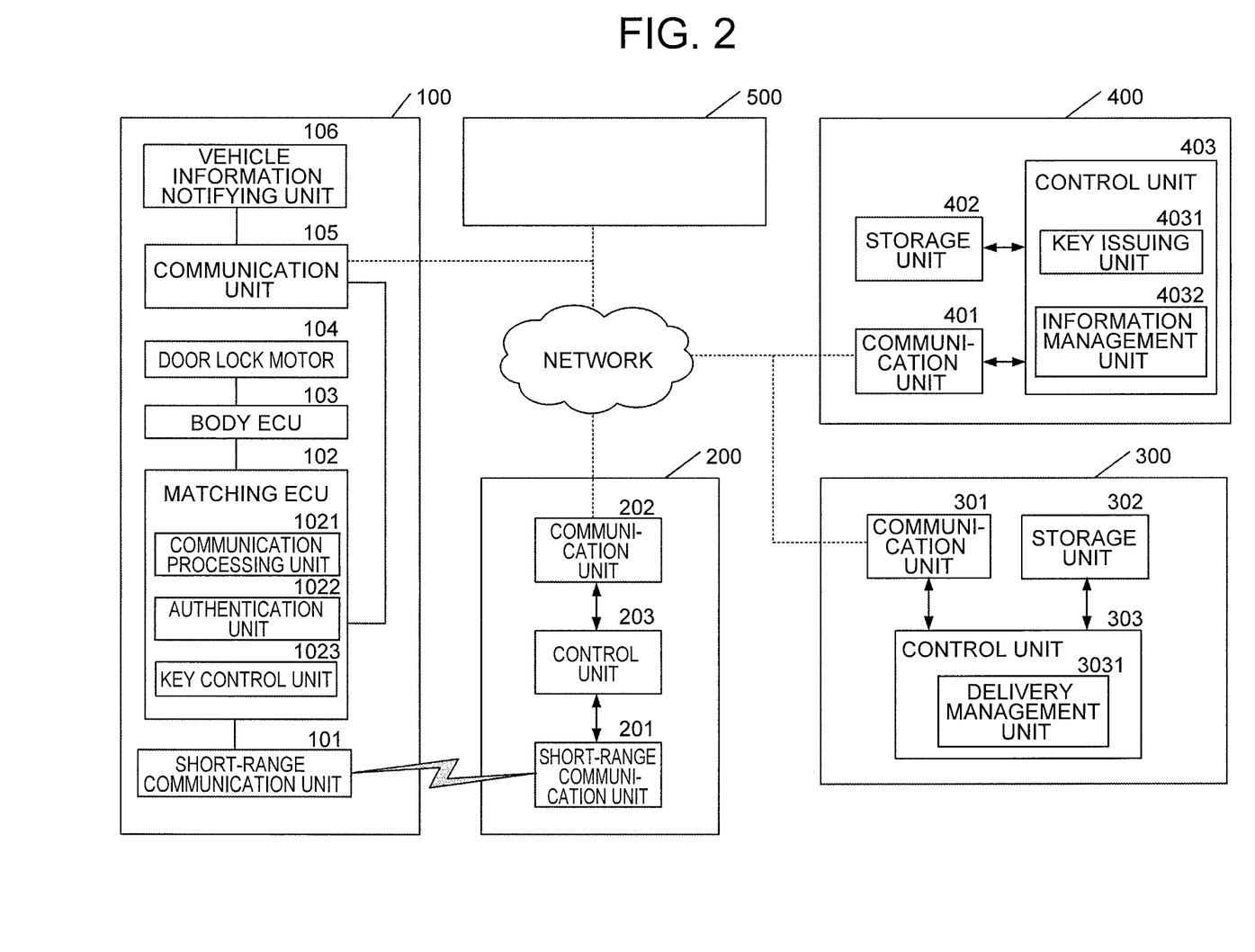
FIG. 2 is a block diagram schematically showing an example of constituent elements that are included in the delivery system.

Next, a configuration of the delivery system will be described. Constituent elements of the system will be described in detail. FIG. 2 is a block diagram schematically showing an example of configurations of the locking-unlocking device 100, the portable terminal 200, the delivery management server 300, the key management server 400 and the EC server 500 shown in FIG. 1. Among them, the locking-unlocking device 100 is mounted on the vehicle 10 as the target of locking-unlocking (locking and unlocking).

The locking-unlocking device 100 is a device for locking and unlocking a door of the vehicle. Specifically, the locking-unlocking device 100 locks and unlocks the door of the vehicle 10, in response to a locking signal and an unlocking signal that are sent from an electronic key (portable device) carried by the user of the vehicle, through high-frequency electric waves. In addition to this function, in the embodiment, the locking-unlocking device 100 has a function to lock and unlock the door based on a result of the communication with the portable terminal 200.

The locking-unlocking device 100 is configured to include a short-range communication unit 101, a matching ECU 102, a body ECU 103, a door lock motor 104, a communication unit 105 and a vehicle information notifying unit 106. The locking-unlocking device 100 operates using electric power that is supplied from an unillustrated auxiliary machinery battery mounted on the vehicle 10. In this example, the illustration of a device that performs communication with the electronic key is omitted.

The short-range communication unit 101 is a module that performs communication with the portable terminal 200 carried by the user. The short-range communication unit 101 performs communication in a short range allowing communication between the interior and exterior of a vehicle cabin, using a predetermined wireless communication standard.

In the embodiment, the short-range communication unit 101 performs data communication in the Bluetooth® Low Energy standard (hereinafter, referred to as BLE). BLE is a low-power communication standard with Bluetooth, and is characterized by allowing communication shortly after detection of a partner without requiring pairing between devices. In the embodiment, BLE is used as an example, but another wireless communication standard may be used. For example, Near Field Communication (NFC), Ultra Wide Band (UWB), WiFi® or the like can be used.

The matching ECU 102 is a computer that performs short-range wireless communication with the portable terminal 200 through the short-range communication unit 101, and performs a control to authenticate the portable terminal 200 and a control to lock and unlock the door of the vehicle 10 based on a result of the authentication. For example, the matching ECU 102 is constituted by a microcomputer. In the following description, the locking signal and the unlocking signal are collectively referred to as a locking-unlocking signal. The term "locking-unlocking signal" means at least one of the locking signal and the unlocking signal.

The matching ECU 102 includes a communication processing unit 1021, an authentication unit 1022 and a key control unit 1023, as functional modules. Each functional module may be realized when a central processing unit (CPU) (not illustrated) executes a program stored in a storage device (not illustrated) such as a read only memory (ROM).

The communication processing unit 1021 processes communication with the portable terminal 200 through the short-range communication unit 101. Specifically, the communication processing unit 1021 receives a locking request or an unlocking request (hereinafter, collectively referred to as a locking-unlocking request) from the portable terminal 200, and generates the locking-unlocking signal in response to the received request. The generated locking-unlocking signal is temporarily stored, and is output at the timing when the authentication unit 1022 described later succeeds in the authentication of the portable terminal 200.

The authentication unit 1022 performs the authentication of the portable terminal 200, based on authentication information included in the locking-unlocking request sent from the portable terminal 200. Specifically, the authentication unit 1022 compares authentication information stored in an unillustrated storage device and the authentication information sent from the portable terminal 200. Then, in the case where the two pieces of authentication information coincide with each other, the authentication unit 1022 determines that the authentication is successful. In the case where the two pieces of authentication information do not coincide with each other, the authentication unit 1022 determines that the authentication is unsuccessful. In the case where the authentication unit 1022 succeeds in the authentication of the portable terminal 200, the locking-unlocking signal generated by the communication processing unit 1021 is sent to the key control unit 1023 described later. The technique of the authentication to be performed by the authentication unit 1022 may be a technique of simply comparing the two pieces of authentication information and checking coincidence, or may be a technique using an asymmetric cipher. As for the above-described "coincide", it is only necessary to confirm that the two pieces of authentication information correspond to each other, and it is not always necessary for the two to be identical. Hereinafter, when appropriate for description, the authentication information to be stored in the locking-unlocking device 100 is referred to as device authentication information, and the authentication information to be sent from the portable terminal 200 is referred to as terminal authentication information. When the two do not need to be discriminated, they are referred to as merely authentication information. The device authentication information to be stored by the authentication unit 1022 is generated by the key management server 400 described later, and is received and stored through a network.

The key control unit 1023 sends an unlocking command or a locking command to the body ECU 103 described later, based on a result of the authentication performed by the authentication unit 1022. The command is sent through an in-vehicle network such as a controller area network (CAN).

The body ECU 103 is a computer that controls a body of the vehicle. The body ECU 103 has a function to unlock and lock the door of the vehicle, by controlling the door lock motor 104 described later, based on the received unlocking command or locking command. The body ECU 103 may further have functions to perform controls of components associated with the vehicle body, as exemplified by a power window control, a seat adjustment, an antitheft control, a seatbelt control and a headlight control.

The door lock motor 104 is an actuator that locks and unlocks the door (including an occupant door, a rear gate and a trunk) of the vehicle 10. The door lock motor 104 operates based on a signal sent from the body ECU 103.

The communication unit 105 is a communication interface for connecting the locking-unlocking device 100 to the network. In the embodiment, the communication unit 105 can perform communication with another device through the network, using a mobile communications service such as 3G and LTE. The vehicle information notifying unit 106 is a device that sends information relevant to the vehicle 10, to the key management server 400 described later. In the embodiment, as the information relevant to the vehicle, the vehicle information notifying unit 106 acquires number plate information (hereinafter, referred to as vehicle number) and position information of the vehicle 10, and periodically sends the vehicle number and the position information to the key management server 400 together with a vehicle ID. The vehicle information notifying unit 106 may include a device for acquiring the position information, a device for storing the information relevant to the vehicle, and the like. Examples of the device for acquiring the position information include a GPS module.

Next, the portable terminal 200 will be described. For example, the portable terminal 200 is a small computer including a smartphone, a portable phone, a tablet computer, a personal information terminal, a notebook computer, and a wearable computer such as a smartwatch. The portable terminal 200 is configured to include a short-range communication unit 201, a communication unit 202 and a control unit 203.

The short-range communication unit 201 is a device that performs communication with the locking-unlocking device 100 in the same communication standard as the communication standard for the short-range communication unit 101. The communication unit 202 is a communication interface for performing connection to the network similarly to the communication unit 105.

The control unit 203 is a device that controls the portable terminal 200. For example, the control unit 203 performs a process of generating the locking-unlocking request, a process of acquiring the above-described terminal authentication information, and a process of sending the locking-unlocking request and the terminal authentication information to the locking-unlocking device 100. For example, the control unit 203 is constituted by a microcomputer. The functions of the control unit 203 may be realized when a CPU (not illustrated) executes a program stored in a storage device (a ROM or the like, not illustrated).

The control unit 203 is connected to an input-output unit (not illustrated) that performs interaction with the user. For example, the input-output unit is constituted by a touch panel, a control device for the touch panel, a liquid-crystal display, and a control device for the liquid-crystal display. In the embodiment, the touch panel and the liquid-crystal display are included in one touch panel display.

The control unit 203 displays an operation screen with the input-output unit, and generates the unlocking request or the locking request based on an operation to be performed by the user. For example, the control unit 203 outputs an icon for unlocking, an icon for locking, and the like, on the touch panel display, and generates the unlocking request or the locking request based on an operation to be performed by the user. The operation to be performed by the user is not limited to an operation to be performed through the touch panel display. For example, the operation may be performed with a hardware switch or the like.

Further, the control unit 203 performs a process of acquiring the terminal authentication information. In the embodiment, the terminal authentication information is generated in the key management server 400 described later, and is transmitted to the portable terminal 200 through the delivery management server 300 described later. When the portable terminal 200 has no terminal authentication information, it is impossible to perform a locking operation and an unlocking operation on the operation screen. The terminal authentication information to be acquired by the portable terminal 200 may be a fixed key, or may be a one-time key. In any case, the device authentication information corresponding to the terminal authentication information is stored in the locking-unlocking device 100 in advance.

Next, the delivery management server 300 will be described. The delivery management server 300 is a server device that manages parcels to be delivered and portable terminals 200 to be carried by a plurality of delivery persons. The delivery management server 300 stores information relevant to the parcel as the target. In the case where the vehicle 10 is designated as the delivery place of the parcel, the delivery management server 300 acquires the terminal authentication information with which the vehicle 10 to contain the parcel is locked and unlocked, from the key management server 400, and transfers the terminal authentication information, to the portable terminal 200. This process is performed before the delivery person starts the delivery.

The delivery management server 300 acquires the device authentication information corresponding to the vehicle 10 (the locking-unlocking device 100), from the key management server 400, and transfers the device authentication information to the locking-unlocking device 100 (the matching ECU 102). This process may be performed whenever the delivery of the parcel is performed, or may be performed at a timing that is unrelated to the delivery of the parcel. In the embodiment, the device authentication information is acquired at the time of setup of the system, and is transferred to the locking-unlocking device 100.

The delivery management server 300 is configured to include a communication unit 301, a storage unit 302 and a control unit 303. The communication unit 301 is a communication interface for performing connection to the network similarly to the communication unit 105.

Figure 3:
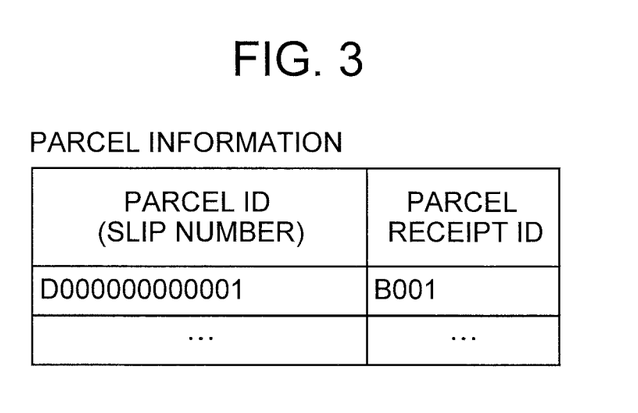
FIG. 3 shows an example of parcel information that is stored in a delivery management server shown in FIG. 1.

The storage unit 302 is a device that stores information, and is constituted by a storage medium such as a RAM, a magnetic disk and a flash memory. Information for delivering the parcel to the vehicle is saved in the storage unit 302. In the embodiment, parcel information shown in FIG. 3 is stored in the storage unit 302, as the information for delivering the parcel to the vehicle. The parcel information is information associated with an identifier (hereinafter, referred to as a parcel ID) of the parcel and an identifier for uniquely specifying the delivery destination (specifically, the vehicle 10 that is the delivery destination) of the parcel. Here, the identifier is an example of the parcel receipt ID in the disclosure. The parcel information is given from the EC server 500 described later and updated whenever the delivery of the parcel is performed. The delivery system in the embodiment identifies the delivery destination of the parcel by the parcel receipt ID, instead of information such as address or name usually described in delivery slip. Incidentally, the parcel receipt ID is different from the ID of the vehicle as the delivery destination. This will be described later.

The control unit 303 is a device that controls the delivery management server 300. For example, the control unit 303 is constituted by a CPU. The control unit 303 includes a delivery management unit 3031 as a functional module. The functional module may be realized when a CPU (not illustrated) executes a program stored in a storage device (not illustrated) such as a ROM.

The delivery management unit 3031 is a device that requests issuance of the authentication information for unlocking the vehicle 10, to the key management server 400, in response to a request from the portable terminal 200. When the delivery management unit 3031 receives the information relevant to the parcel scheduled to be delivered, from the portable terminal 200, the delivery management unit 3031 specifies the parcel receipt ID based on the parcel information stored in the storage unit 302. Further, the delivery management unit 3031 requests the key management server 400 to issue the terminal authentication information for locking and unlocking the vehicle 10 corresponding to the parcel receipt ID. Further, the delivery management unit 3031 transfers the terminal authentication information issued by the key management server 400, to the portable terminal 200.

Next, the key management server 400 will be described. The key management server 400 is a device that issues the terminal authentication information to be used by the portable terminal 200 and the device authentication information to be used by the locking-unlocking device 100, in response to a demand from the delivery management server 300. The key management server 400 is configured to include a communication unit 401, a storage unit 402 and a control unit 403.

The communication unit 401 is a communication interface for performing connection to the network similarly to the communication unit 301.

The storage unit 402 is a device that stores information, and is constituted by a storage medium such as a RAM, a magnetic disk and a flash memory. The device authentication information corresponding to the locking-unlocking device 100, the terminal authentication information paired with the device authentication information, and a variety of data for generating the device authentication information and the terminal authentication information are saved in the storage unit 402.

Figure 4A:
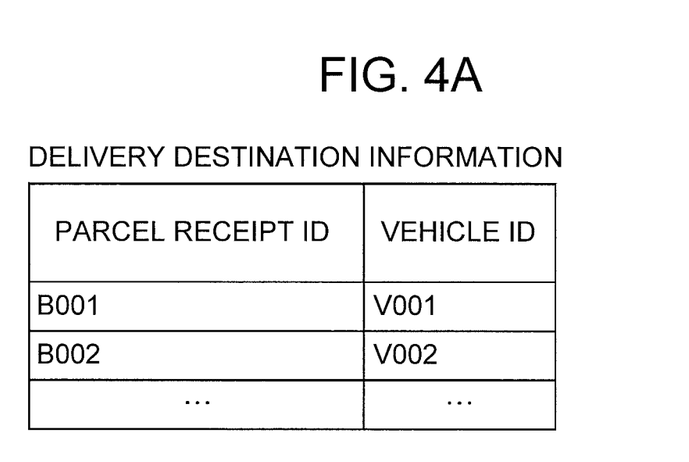
FIG. 4A shows an example of delivery destination information that is stored in a key management server.
Figure 4B:
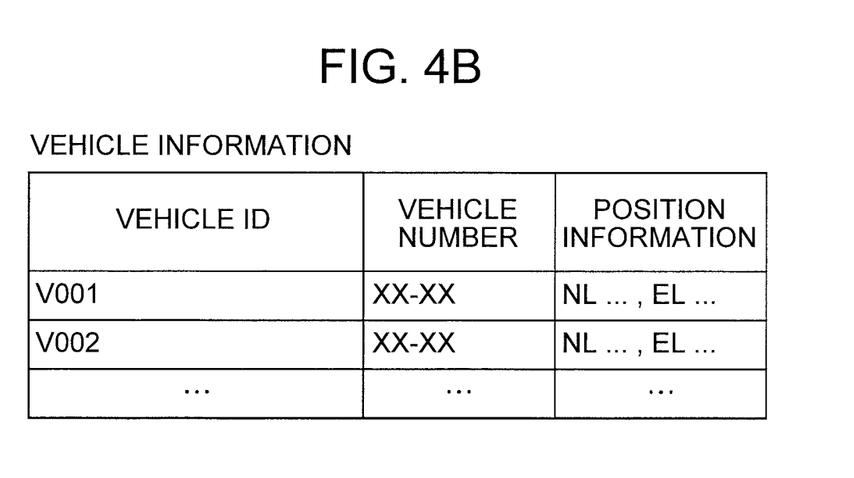
FIG. 4B shows an example of vehicle information that is stored in the key management server.

Further, information with which the vehicle 10 as the target is specified based on the parcel receipt ID is stored in the storage unit 402. In the embodiment, two kinds of information shown in FIG. 4A and FIG. 4B are stored in the storage unit 402.

Delivery destination information is information associating the parcel receipt ID and the identifier for uniquely specifying the vehicle 10. Here, the identifier is an example of the vehicle ID in the disclosure. For example, when the parcel receipt ID is an ID corresponding to the consignee, it can be said that the vehicle ID is an ID corresponding to the vehicle designated by the consignee. The parcel receipt ID may be any kind of information, if the information is information related to the vehicle which is the delivery destination. For example, the parcel receipt ID may be a character string given by the system, a character string designated by the consignee, an e-mail address, or the like. The parcel receipt ID may be information which uniquely identifies the consignee individual or information which uniquely identifies address or residence of the consignee. However, it is preferable that the information is not information in which private information (i.e. name, address, residence, etc.) of the consignee is directly represented by letters or characters.

Vehicle information is information associating the vehicle ID and the information relevant to the corresponding vehicle. In the embodiment, the vehicle information, which includes the vehicle number and the position information, is updated based on information that is sent from the vehicle 10 (the vehicle information notifying unit 106). The vehicle information may include information other than the exemplified information. For example, the vehicle information may include the vehicle model or color of the vehicle 10, the parking section number, the address corresponding to the position information, or the like. Such information may be acquired from the vehicle information notifying unit 106 included in the vehicle 10, or may be generated by the key management server 400 based on the acquired information.

The control unit 403 is a device that controls the key management server 400. For example, the control unit 403 is constituted by a CPU. The control unit 403 includes a key issuing unit 4031 and an information management unit 4032 as functional modules. Each functional module may be realized when a CPU (not illustrated) executes a program stored in a storage device (not illustrated) such as a ROM.

The key issuing unit 4031 issues the terminal authentication information and the device authentication information, in response to a demand from the delivery management server 300. As described above, the terminal authentication information is authentication information with which the portable terminal 200 locks and unlocks the vehicle 10 through the locking-unlocking device 100. The device authentication information is authentication information that is paired with the terminal authentication information.

The terminal authentication information and the device authentication information may be previously stored to be acquired, or may be dynamically generated. For example, it is allowable to generate authentication information that is valid only in a predetermined time period, authentication information for which the number of times of use is designated, or authentication information that can be used only in a predetermined portable terminal 200. In the case where the vehicle 10 includes a plurality of regions that can be independently locked and unlocked, as exemplified by a vehicle cabin and a trunk, it is allowable to generate authentication information that allows only one region to be locked and unlocked.

The information management unit 4032 acquires the above-described delivery destination information (the information associating the parcel receipt ID and the vehicle ID), and causes the delivery destination information to be stored in the storage unit 402. For example, the delivery destination information may be generated based on information obtained from the consignee. Further, the information management unit 4032 acquires the vehicle information corresponding to the vehicle 10, from the vehicle information notifying unit 106 included in the vehicle 10, and causes the vehicle information to be stored in the storage unit 402. That is, the information management unit 4032 collects and manages the information shown in FIG. 4A and FIG. 4B.

The EC server 500 is a server device that accepts the order for the product from the consignee. The EC server 500 is a general-purpose computer, and therefore, detailed descriptions of the configuration of the EC server 500 are omitted. At the time of the acceptance of the order for the product, the EC server 500 acquires the parcel receipt ID from the consignee. At the time of the shipment of the product, the EC server 500 sends a delivery notice including the slip number and the parcel receipt ID, to the delivery management server 300 corresponding to the delivery business operator. Thereby, the information shown in FIG. 3 is stored in the delivery management server 300.

Figure 5:
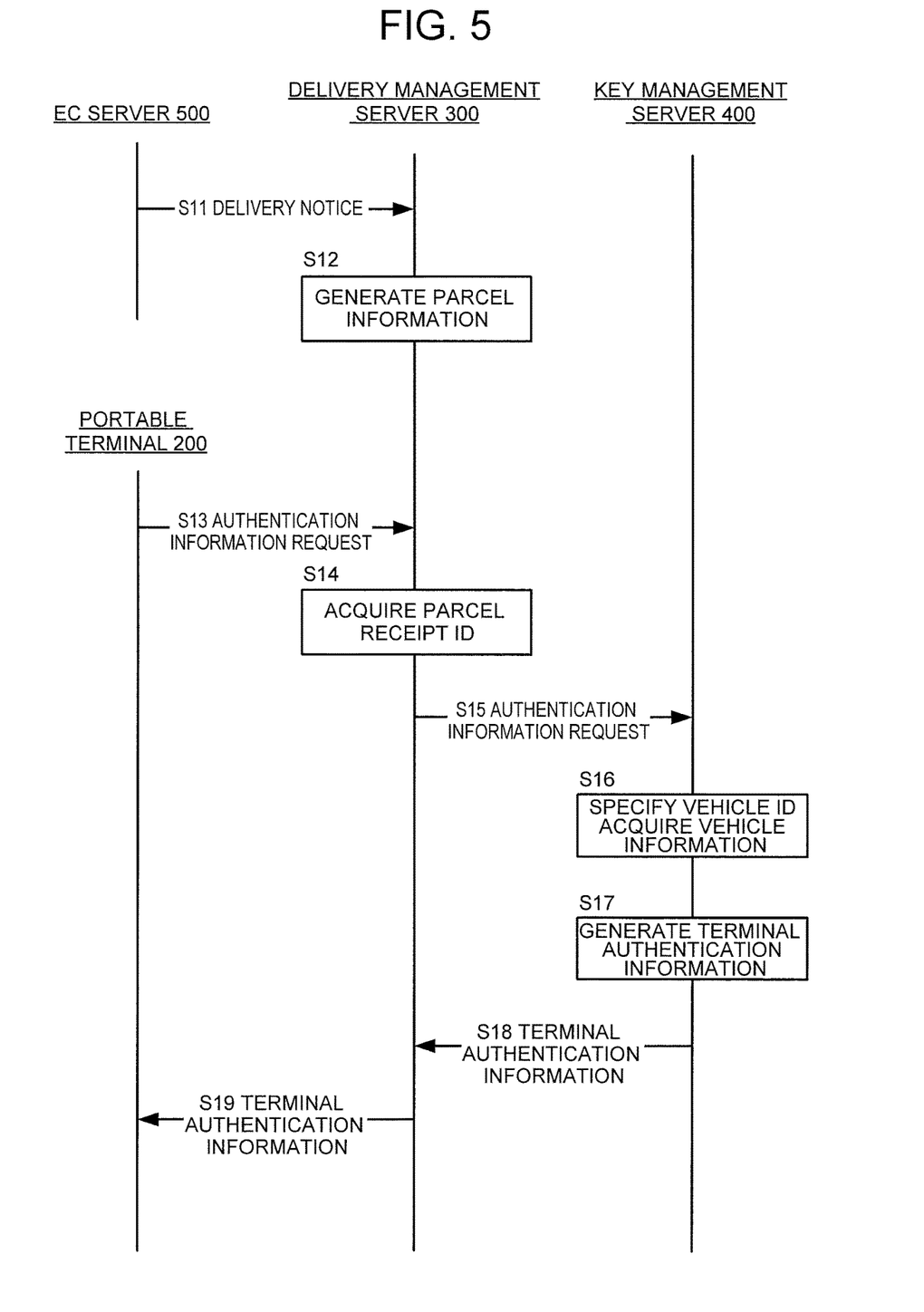
FIG. 5 is a diagram for explaining a data flow in the embodiment.
Figure 6:
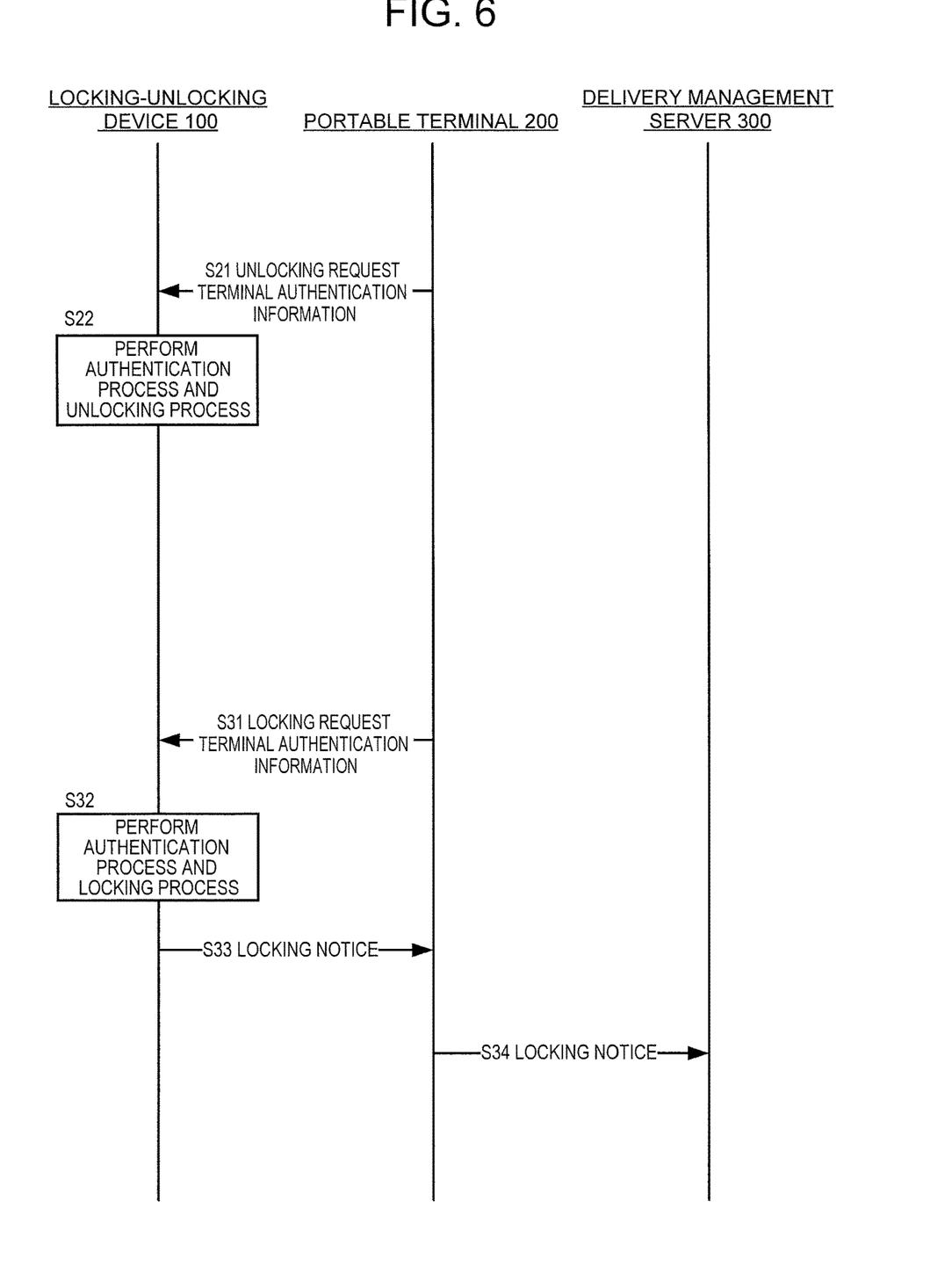
FIG. 6 is a diagram for explaining the data flow in the embodiment.

Next, processes that are performed by the above-described constituent elements will be described. The processes are classified into a first phase in which the parcel information is generated in connection with the shipment of the parcel, a second phase in which the portable terminal 200 acquires the terminal authentication information, and a third phase in which the portable terminal 200 accesses the locking-unlocking device 100 using the acquired terminal authentication information and locks and unlocks the vehicle. FIG. 5 is a diagram illustrating a flow of data in the first and second phases, and FIG. 6 is a diagram illustrating a flow of data in the third phase.

The first and second phases will be described with reference to FIG. 5. The processes of steps S11 to S12 are executed when the delivery of the parcel is performed. First, the EC server 500 sends the delivery notice including the parcel ID and the parcel receipt ID, to the delivery management server 300 (step S11). Here, the sent parcel ID is a slip number that is previously issued, and the parcel ID is designated by the consignee, when the EC server 500 receives the order for the product. Next, in step S12, based on the received information, the delivery management server 300 (the delivery management unit 3031) generates the parcel information shown in FIG. 3. The parcel ID may be generated by the delivery management server 300.

The processes of steps S13 to S19 are executed when the portable terminal 200 requests the issuance of the terminal authentication information. The processes of steps S13 to S19 are preparation processes for locking and unlocking, and therefore, preferably should be performed in advance. For example, the processes of steps S13 to S19 may be executed at the stage of preparation for the delivery.

First, in step S13, the portable terminal 200 requests the issuance of the terminal authentication information to the delivery management server 300. In the step, the information with which the portable terminal 200 is identified and the parcel ID (slip number) with which the parcel to be delivered is uniquely identified are concurrently sent as an authentication information request.

In step S14, the delivery management server 300 acquires the parcel receipt ID. In the step, the delivery management unit 3031 refers to the parcel information stored in the storage unit 302, and uniquely specifies the parcel receipt ID. In step S15, the delivery management unit 3031 adds the specified parcel receipt ID to the authentication information request, and then sends the authentication information request to the key management server 400.

In step S16, the information management unit 4032 specifies the vehicle ID of the vehicle 10 as the delivery destination of the parcel, based on the received parcel receipt ID and the stored delivery destination information. Further, the information management unit 4032 acquires the vehicle information corresponding to the specified vehicle ID. As described above, the delivery destination information is previously generated based on the information obtained from the consignee. As the vehicle information, the information periodically sent from the vehicle 10 (the vehicle information notifying unit 106) is stored.

Next, in step S17, the key issuing unit 4031 generates and acquires the terminal authentication information specific to the portable terminal 200 and the vehicle 10 (the locking-unlocking device 100 corresponding to the specified vehicle ID).

Next, in step S18, the key issuing unit 4031 sends the generated terminal authentication information to the delivery management server 300. Further, the delivery management server 300 transfers the terminal authentication information to the portable terminal 200 (step S19). Thereby, it is possible to perform an operation for unlocking the vehicle 10, on the portable terminal 200.

In steps S18 and S19, the vehicle information corresponding to the vehicle 10 as the delivery destination is sent as information attached to the terminal authentication information. Thereby, the portable terminal 200 can obtain the position information and vehicle number (number plate information) of the vehicle. The delivery person can find the vehicle 10 as the delivery destination, based on the position information and the vehicle number.

In the embodiment, the terminal authentication information is transferred through the delivery management server 300. However, the terminal authentication information may be directly sent from the key management server 400 to the portable terminal 200. Further, in the embodiment, the device authentication information is previously issued by the key management server 400, and is stored in the locking-unlocking device 100. However, the key management server 400 may be issued at the same timing as step S14, and may be transferred to the locking-unlocking device 100 through the delivery management server 300.

The third phase will be described with reference to FIG. 6. Steps S21 to S22 are processes for unlocking the vehicle 10 using the portable terminal 200. When the user (that is, the delivery person) of the portable terminal 200 performs the operation for unlocking the vehicle 10 through the input-output unit, the link with BLE is established between the portable terminal 200 and the locking-unlocking device 100, and in step S21, the portable terminal 200 sends the unlocking request and the terminal authentication information to the locking-unlocking device 100.

In step S22, the authentication unit 1022 included in the locking-unlocking device 100 compares the terminal authentication information sent from the portable terminal 200 and the device authentication information stored in advance, and performs the authentication process. When the authentication is successful, the key control unit 1023 performs an unlocking process of unlocking the door of the vehicle 10.

Steps S31 to S34 are processes for locking the vehicle 10 using the portable terminal 200. The user of the portable terminal 200 performs an operation for locking the vehicle 10 through the input-output unit, which is a touch panel screen, for example. Then, in step S31, the portable terminal 200 sends the locking request and the terminal authentication information to the locking-unlocking device 100.

In step S32, the authentication unit 1022 included in the locking-unlocking device 100 compares the terminal authentication information sent from the portable terminal 200 and the device authentication information stored in advance, and performs the authentication process. When the authentication is successful, the key control unit 1023 performs a locking process of locking the door of the vehicle 10.

After the locking, the communication processing unit 1021 included in the locking-unlocking device 100 sends a notice (locking notice) of completion of the locking, to the portable terminal 200 (step S33). Thereby, the notice of completion of the locking is output on the touch panel screen of the portable terminal 200. In the case where the terminal authentication information is a one-time key, the one-time key may be invalidated at the timing of step S33. Finally, the portable terminal 200 sends the locking notice to the delivery management server 300 (step S34). The delivery management server 300 may send a message indicating completion of the delivery, to a terminal associated with the consignee, for example, to the portable terminal carried by the consignee.

With the above-described embodiment, the consignee can receive the parcel using the vehicle, simply by giving the notice of the parcel receipt ID to the EC server 500 at the time of the order for the product. Particularly, since the position information included in the vehicle information is periodically updated, the consignee can receive the parcel even if the vehicle moves.

Next, a first modification of the embodiment will be described. In the description of the embodiment, the delivery destination information to be stored in the key management server 400 is previously generated based on the information obtained from the consignee. However, the delivery destination information does not need to be fixed, and may be updated at an arbitrary timing. For example, when the consignee accesses the key management server 400 using a terminal, the consignee's parcel receipt ID may be linked with an arbitrary vehicle ID. With this mode, it is possible to use, as the delivery destination, the vehicle 10 which is not possessed by the consignee, for example, a car sharing vehicle.

Next, a second modification of the embodiment will be described. In the description of the embodiment, the delivery management server 300 performs the request of the issuance of the authentication information, based on the request sent from the portable terminal 200. However, the request of the issuance of the authentication information may be triggered by another event. For example, the processes of steps S14 to S19 may be executed at the timing when the delivery management server 300 generates the parcel information in step S12. That is, the authentication information may be issued at the stage when the delivery procedure of the parcel is performed. Such a process can be adopted in the case where the portable terminal 200 to be used at the time of the delivery is specified in advance. Only the processes of steps S14 to S18 may be performed in advance, and the process of step S19 may be performed at the time of the delivery, that is, after the portable terminal 200 to be used at the time of the delivery is specified.

Next, a third modification of the embodiment will be described. In the description of the embodiment, the vehicle number and the position information are used as the vehicle information. However, only one of them may be used as the vehicle information. Further, other information may be added to the vehicle information. For example, the vehicle model or color of the vehicle 10, the parking section number, the address corresponding to the position information, or the like may be added, and may be sent to the portable terminal 200.

Next, other modifications of the embodiment will be described. The above embodiment and the above first, second and third modifications are just examples, and the disclosure can be appropriately modified to be carried out, without departing from the spirit of the disclosure. For example, in the description of the embodiment, the vehicle cabin and trunk of the vehicle have been exemplified as the region where the parcel is held and that can be locked and unlocked, but the disclosure is not always limited to them. The disclosure can be applied to objects other than the vehicle, for example, to a facility, a containment apparatus and the like, if there is a region that can be locked and unlocked using a portable terminal.

Further, in the description of the embodiment, the system in which the parcel is delivered has been exemplified, but the same configuration can be applied to a system in which the parcel is picked up. In this case, the delivery destination only needs to be replaced with a pickup destination.

Further, in the description of the embodiment, the mode in which the consignee orders the product through the EC server has been exemplified. However, the disclosure may be applied to another mode. For example, the delivery management server 300 may acquire the parcel receipt ID as the destination, from a shipper of the parcel. When the delivery business operator can acquire the parcel receipt ID in this way, the disclosure can be applied to a mode in which a third party ships the parcel.

What is claimed is:

1. An information processing apparatus comprising:
    a processor; and
    a memory in communication with the processor, the memory storing computer-readable instructions that are executed by the processor and that perform operations including:
    storing, in association with each other, vehicle information with which a vehicle is identified, and parcel receipt information with which the vehicle is specified instead of an address or a name,
    specifying the vehicle based on the parcel receipt information, and
    sending authentication information to a device.

2. The information processing apparatus of claim 1, further comprising:
    position information acquiring circuitry configured to acquire the vehicle information of the vehicle,
    wherein the processor is further configured to send the vehicle information of the vehicle to the device.

3. The information processing apparatus of claim 1, wherein:
    the memory is configured to further store characteristic information as information relevant to a characteristic with which the vehicle is identified, in association with the parcel receipt information and the vehicle information, and
    the processor is further configured to send the characteristic information to the device.

4. The information processing apparatus of claim 3, wherein the characteristic information includes at least one of a vehicle model of the vehicle, a color of the vehicle, number plate information of the vehicle, a parking section of the vehicle, and an address of a parking place of the vehicle.

5. The information processing apparatus of claim 1, wherein the memory is further configured to update information associating the parcel receipt information and the vehicle information, based on information acquired from a consignee of a parcel.

6. The information processing apparatus of claim 1, wherein the processor is further configured to receive the parcel receipt information from the device.

7. The information processing apparatus of claim 1, wherein the processor is further configured to acquire the authentication information with which the vehicle is unlocked, the acquiring the authentication information including the processor being configured to (i) send, to a server, an authentication information request that includes the parcel receipt information, and (ii) receive, from the server in response to the authentication information request, the authentication information.

8. An information processing method comprising:
    storing, in a memory of an information processing apparatus, in association with each other, vehicle information with which a vehicle is identified, and parcel receipt information with which the vehicle is specified instead of an address or a name; and
    specifying, by processing circuitry of the information processing apparatus, the vehicle based on the parcel receipt information.

9. The information processing method of claim 8, further comprising:
    acquiring, by position information acquiring circuitry of the information processing apparatus, the vehicle information of the vehicle; and sending, by the processing circuitry of the information processing apparatus, the vehicle information of the vehicle to a device.

10. The information processing method of claim 8, further comprising:
storing, in the memory of the information processing apparatus, characteristic information as information relevant to a characteristic with which the vehicle is identified, in association with the parcel receipt information and the vehicle information, and
sending, by the processing circuitry of the information processing apparatus, the characteristic information to a device.

11. The information processing method of claim 10, wherein the characteristic information includes at least one of a vehicle model of the vehicle, a color of the vehicle, number plate information of the vehicle, a parking section of the vehicle, and an address of a parking place of the vehicle.

12. The information processing method of claim 8, wherein information associating the parcel receipt information and the vehicle information is updated based on information acquired from a consignee of a parcel.

13. The information processing method of claim 8, further comprising:
receiving the parcel receipt information from a device.

14. The information processing method of claim 8, further comprising:
acquiring, by the processing circuitry of the information processing apparatus, authentication information with which the vehicle is unlocked; and
sending the authentication information to a device,
wherein the acquiring the authentication information further includes:
sending, by the processing circuitry of the information processing apparatus to a server, an authentication information request that includes the parcel receipt information; and
receiving, by the processing circuitry of the information processing apparatus from the server in response to the authentication information request, the authentication information.

15. A non-transitory computer readable medium having instructions stored therein, which when executed by a processor in an information processing apparatus cause the processor to execute a method comprising:
storing, in association with each other, vehicle information with which a vehicle is identified, and parcel receipt information with which the vehicle is specified instead of an address or a name; and
specifying the vehicle based on the parcel receipt information.

16. The non-transitory computer readable medium of claim 15, the method further comprising:
acquiring the vehicle information of the vehicle; and
sending the vehicle information of the vehicle to a device.

17. The non-transitory computer readable medium of claim 15, the method further comprising:
storing characteristic information as information relevant to a characteristic with which the vehicle is identified, in association with the parcel receipt information and the vehicle information; and
sending the characteristic information to a device.

18. The non-transitory computer readable medium of claim 17, wherein the characteristic information includes at least one of a vehicle model of the vehicle, a color of the vehicle, number plate information of the vehicle, a parking section of the vehicle, and an address of a parking place of the vehicle.

19. The non-transitory computer readable medium of claim 15, wherein information associating the parcel receipt information and the vehicle information is updated based on information acquired from a consignee of a parcel.

20. The non-transitory computer readable medium of claim 15, further comprising:
acquiring authentication information with which the vehicle is unlocked; and
sending the authentication information to a device,
wherein the acquiring the authentication information further includes:
sending, to a server, an authentication information request that includes the parcel receipt information; and
receiving, from the server in response to the authentication information request, the authentication information.

* * * * *